(12) United States Patent
Viola et al.

(10) Patent No.: US 6,823,746 B2
(45) Date of Patent: Nov. 30, 2004

(54) MAGNETOELASTIC TORQUE SENSOR FOR MITIGATING NON-AXISYMMETRIC INHOMOGENEITIES IN EMANATING FIELDS

(75) Inventors: Jeffrey L. Viola, Berkley, MI (US); William T. Moore, Ypsilanti, MI (US); Leon Bogdanov, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 170 days.

(21) Appl. No.: 10/193,754

(22) Filed: Jul. 11, 2002

(65) Prior Publication Data

US 2004/0007083 A1 Jan. 15, 2004

(51) Int. Cl.[7] .................................................. G01L 3/02
(52) U.S. Cl. .................................................. 73/862.335
(58) Field of Search ....................... 73/862.08, 862.191, 73/862.331, 862.333, 862.335

(56) References Cited

U.S. PATENT DOCUMENTS

| | | | |
|---|---|---|---|
| 4,453,420 A | 6/1984 | Nakane et al. | |
| 4,651,573 A | 3/1987 | Himmelstein et al. | |
| 4,716,556 A | 12/1987 | Raskin et al. | |
| 4,896,544 A | * 1/1990 | Garshelis | 73/862.333 |
| 4,933,580 A | 6/1990 | Ishino et al. | |
| 4,986,137 A | 1/1991 | Sato et al. | |
| 5,022,275 A | 6/1991 | Satoh et al. | |
| 5,036,713 A | 8/1991 | Ikeda et al. | |
| RE34,039 E | 8/1992 | Kobayashi et al. | |
| 5,187,433 A | 2/1993 | Even | |
| 5,321,985 A | 6/1994 | Kashiwagi et al. | |
| 5,386,733 A | 2/1995 | Hesthamar et al. | |
| 5,442,966 A | 8/1995 | Hase et al. | |
| 5,449,418 A | 9/1995 | Takagi et al. | |
| 5,465,627 A | 11/1995 | Garshelis | |
| 5,493,921 A | 2/1996 | Alasafi et al. | |
| 5,520,059 A | 5/1996 | Garshelis | |
| 5,526,704 A | 6/1996 | Hoshina et al. | |
| 5,880,379 A | * 3/1999 | Tanaka et al. | 73/862.335 |
| 6,184,680 B1 | 2/2001 | Shinoura et al. | |
| 6,223,607 B1 | 5/2001 | Yasui | |
| 6,237,428 B1 | 5/2001 | Odachi et al. | |
| 6,330,833 B1 | 12/2001 | Opie et al. | |

FOREIGN PATENT DOCUMENTS

| | | |
|---|---|---|
| EP | 0 321 662 | 10/1988 |
| WO | PCT/US96/02068 | 8/1996 |

\* cited by examiner

*Primary Examiner*—Edward Lefkowitz
*Assistant Examiner*—Corey D. Mack
(74) *Attorney, Agent, or Firm*—MacMillan, Sobanski & Todd, LLC

(57) ABSTRACT

A torque sensor for magnetically detecting torque transmitted to a rotatable shaft without directly contacting the shaft comprises a magnetic alloy and one or more sensing elements about the magnetic alloy to measure a magnetic field emanating from the magnetic alloy without being affected by anomalies in magnetic alloy.

25 Claims, 12 Drawing Sheets

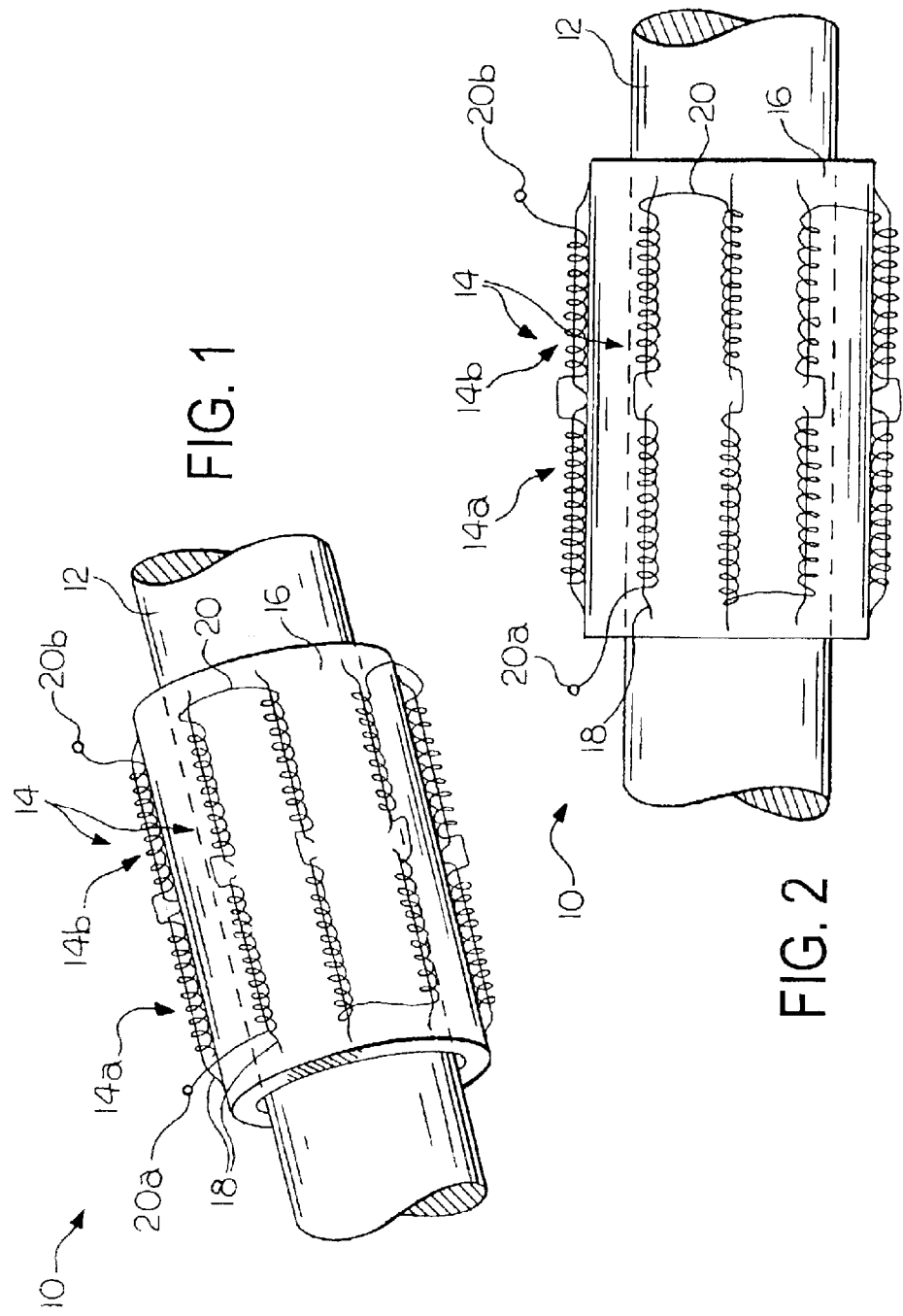

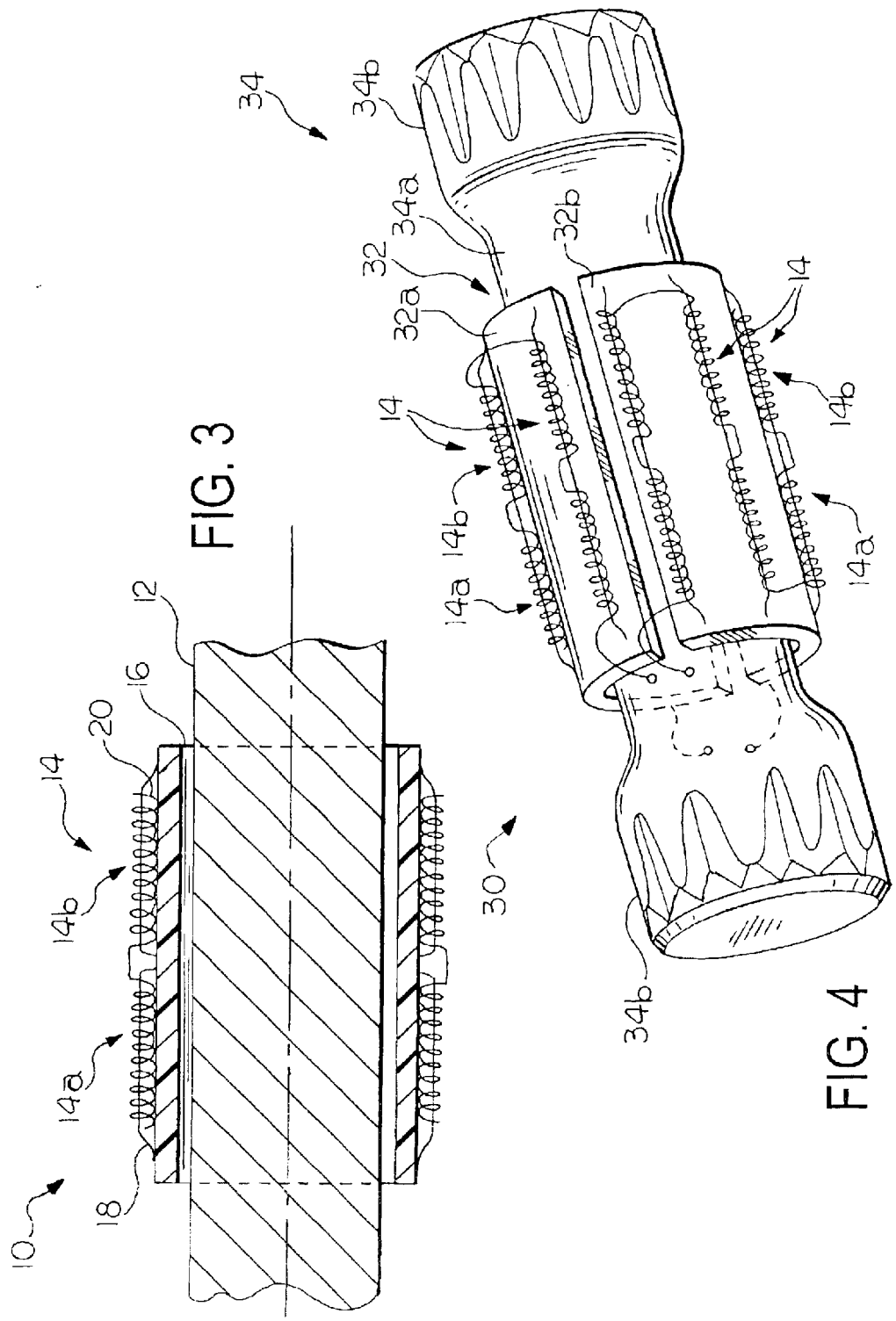

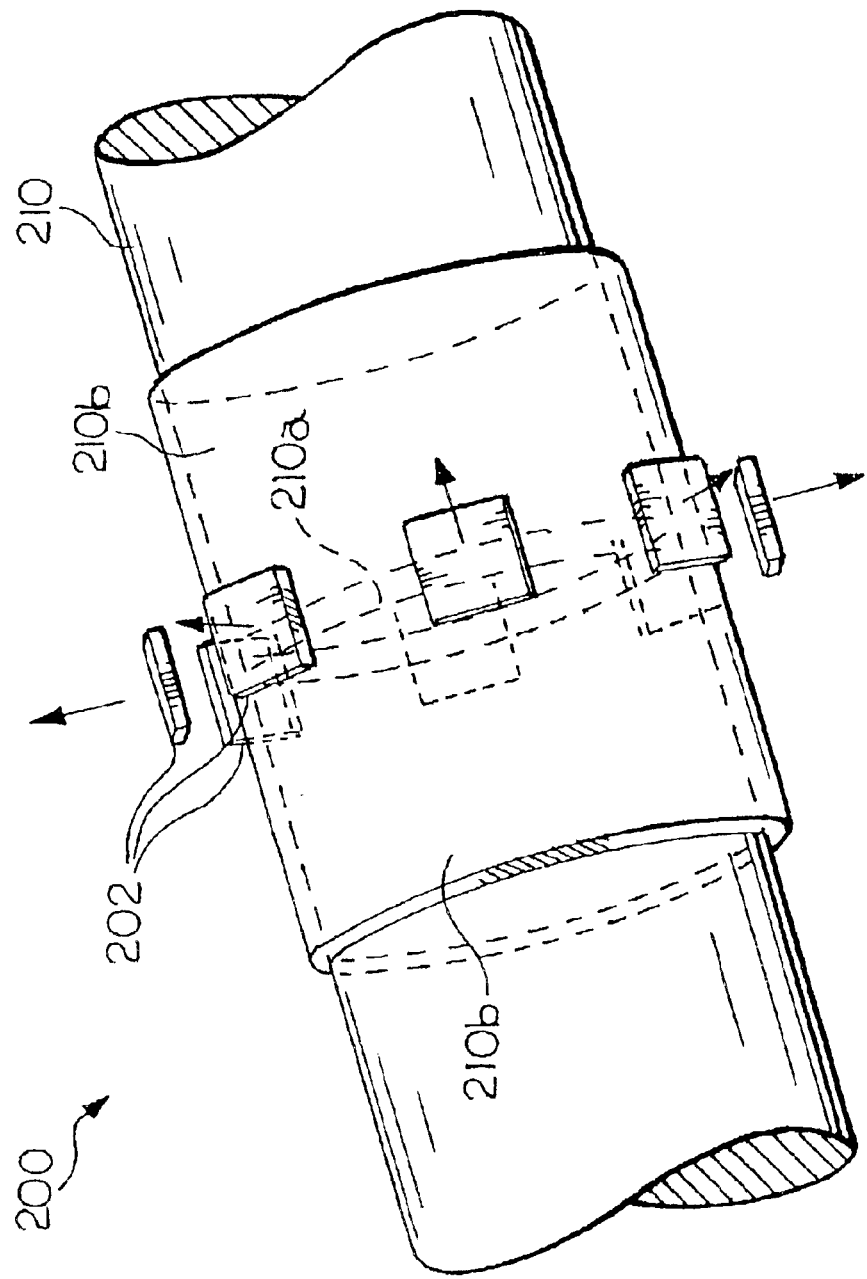

MAGNETOELASTIC TORQUE SENSOR FOR MITIGATING NON-AXISYMMETRIC INHOMOGENEITIES IN EMANATING FIELDS

BACKGROUND OF INVENTION

1. Field of the Invention

This invention relates in general to measuring and testing and more particularly relates to an apparatus for measuring torque. Most particularly, the invention relates to a torque sensor for magnetically detecting torque transmitted to a rotatable shaft without directly contacting the shaft.

2. Description of the Prior Art

Torque sensors which magnetically detect torque through magnetoelastic and/or magnetostrictive phenomena are well known. There are typically two types of torque sensors. One type of torque sensor includes a rotatable shaft made of a magnetic alloy. Another type of torque sensor includes a rotatable shaft carrying a magnetic alloy layer on its outer peripheral surface. Either type of torque sensor further includes magnetic field sensors that are disposed adjacent the magnetic alloy. The magnetic field sensors are provided for detecting a magnetic field emanating from the magnetic alloy. The magnetic field sensors are typically, but not necessarily, configured and arranged to exclude influence of an external magnetic field, such as the magnetic field of the earth. For example, when a torque is transmitted to the rotatable shaft, the magnetic alloy is mechanically stressed or otherwise deformed. This causes a magnetic field to be emanating from the magnetic alloy. The magnetic field is sensed by the magnetic field sensors. The magnetic field sensed by the magnetic field sensors is measured by a detector, which produces an output signal that correlates to a direction and magnitude of the torque transmitted to the shaft.

When measuring torque in a rotatable shaft, ideally the emanating magnetic fields would be axisymmetrical. However, anomalies in the magnetic alloy and/or in the magnetic preconditioning imparted on the magnetic alloy can produce non-axisymmetrical inhomogeneities in the magnetic field emanating from the shaft. As the shaft rotates, the anomalies in the magnetic alloy move with the shaft. Consequently, the inhomogeneities in the magnetic field emanating from the shaft move as the shaft rotates. When the inhomogeneities in the magnetic field are sensed by the magnetic field sensors configured in an circumferentially limited angular expanse about the shaft, the detector produces a deviation in the output signal that is erroneously interpreted as a change in direction and/or magnitude of the torque transmitted to the shaft. The desired response of the sensor should be to applied torque only. By contrast, the anomalous output signal is associated with an undesirable response to the rotation angle of the shaft.

What is needed is a torque sensor that is unaffected by anomalies in magnetic alloy and thus provides an accurate and dependable detection of torque transmitted to the rotatable shaft.

SUMMARY OF INVENTION

Generally speaking, the present invention is directed towards a torque sensor that meets the foregoing needs. The torque sensor magnetically detects torque transmitted to a rotating rotatable shaft without directly contacting the shaft. The torque sensor comprises a magnetic alloy and one or more sensing elements about the magnetic alloy to measure a magnetic field emanating from the magnetic alloy without being affected by anomalies in magnetic alloy.

Various objects and advantages of this invention will become apparent to those skilled in the art from the following detailed description of the preferred embodiment, when read in light of the accompanying drawings.

BRIEF DESCRIPTION OF DRAWINGS

FIG. 1 is a perspective view of a torque sensor according to the invention for detecting a magnetic field emanating from a rotatable shaft in an axial direction relative to the shaft.

FIG. 2 is a side elevational view of the torque sensor illustrated in FIG. 1.

FIG. 3 is a diagrammatic representation of the torque sensor illustrated in FIGS. 1 and 2.

FIG. 4 is an environmental perspective view of another torque sensor according to the invention.

FIG. 19 is a diagrammatic representation in cross-section of another torque sensor according to the invention.

DETAILED DESCRIPTION

Figure 5:
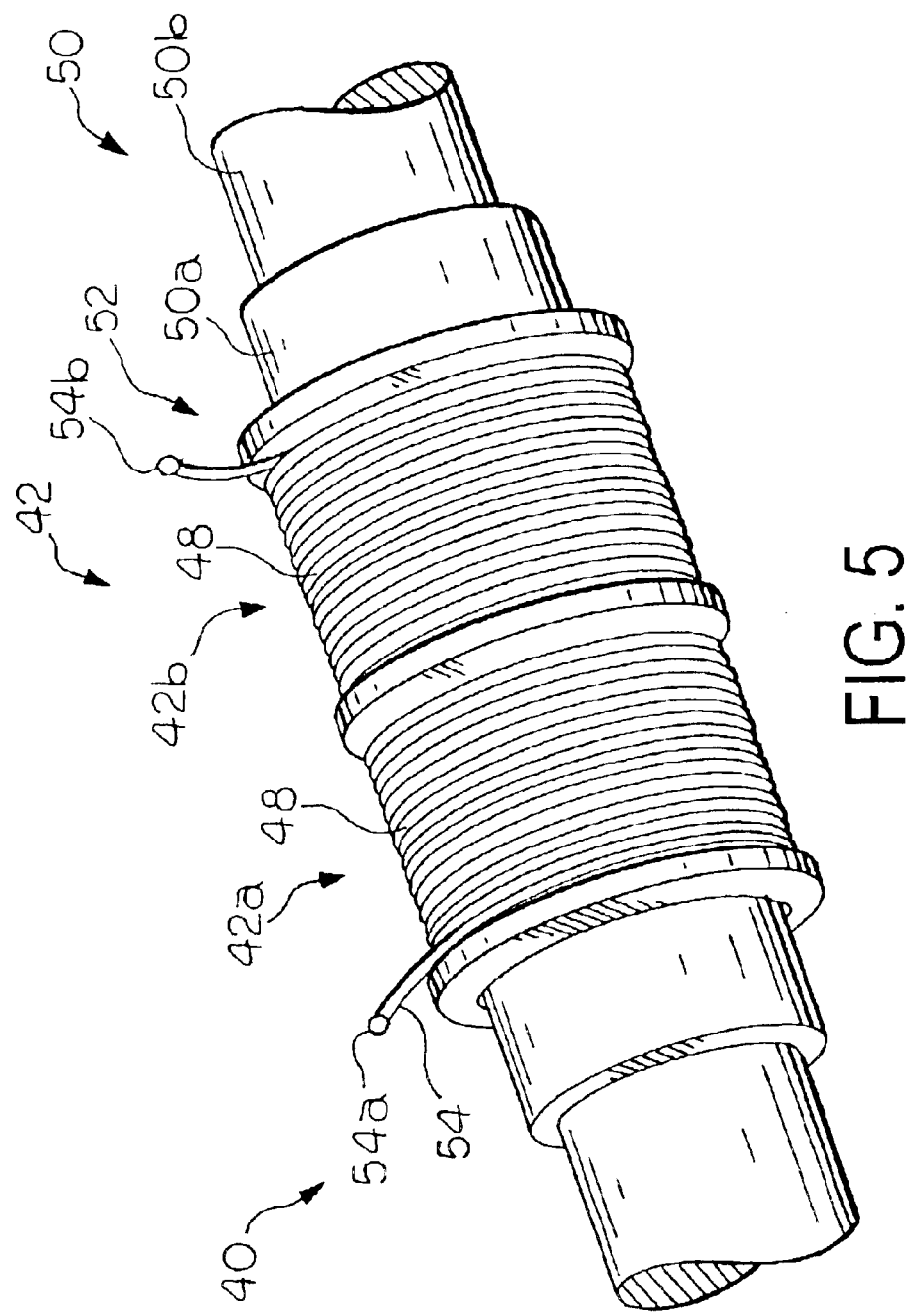
FIG. 5 is an environmental perspective view of yet another torque sensor according to the invention.

Referring now to the drawings, wherein like numerals designate like components throughout all of the several Figures, there is illustrated in FIGS. 1–3 a torque sensor 10 according to the invention on a rotatable shaft 12. The torque sensor 10 is provided for magnetically detecting torque transmitted to the rotatable shaft 12 without directly contacting the shaft 12. The shaft 12 can be made of a magnetic alloy, wherein the magnetic alloy is a material component of the shaft, or carry a magnetic alloy layer on its outer peripheral surface. When a torque is transmitted to the shaft 12, the magnetic alloy is mechanically stressed or otherwise deformed. This causes a magnetic field to emanate from the magnetic alloy. A component of the magnetic field is sensed by the torque sensor 10 to produce an output signal that correlates to a direction and magnitude of the torque transmitted to the shaft 12.

According to one embodiment of the invention, the torque sensor 10 is comprised of a plurality of sensing elements in the form of coil pairs 14 which are disposed over a circumferential angular expanse of the torque sensing shaft 12. The coil pairs 14 are held in spaced relation to the shaft 12. This can be accomplished with any suitable support, such as the bobbin 16 shown. Each coil pair 14 is supported by one or more core elements 18 that are made of a magnetic alloy. Each coil pair 14 includes a first coil 14a wound in a first direction and a second coil 14b wound in a second direction opposite to the first direction. The first coil 14a and the second coil 14b are axially disposed in end-to-end alignment with one another and adjacent the bobbin 16. The shaft 12 passes through the bobbin 16 and is in a spaced relation to the bobbin 16 so that the bobbin 16 does not contact the shaft 12.

In a preferred embodiment of the invention, all the coil pairs 14 are wound from a single strand of wire 20. For example, the single strand of wire 20 can be wound in the first direction around a core element 18 to form one of the first coils 14a and then wound in the second direction around the same or another core element 18 to form a corresponding one of the second coils 14b. Then, the single strand of wire 20 can be wound around one or more circumferentially adjacent core elements 18 to form another coil pair 14, as illustrated in the drawings. The single strand of wire 20 of the resultant torque sensor 10 has two terminal ends with nodes 20a, 20b through which current can be passed. According to the preferred embodiment of the invention, the first and second coils 14a, 14b and the coil pairs 14 formed thereby are connected in series or daisy-chained so that the torque sensor 10 can be connected to a detector (not shown) via the two nodes 20a, 20b. Alternatively, each of the coil pairs 14 and each of the first and second coils 14a, 14b formed thereby can be individually connected to the detector which thereafter arithmetically combines the response of the individual coils 20a, 20b to produce an aggregate output signal which is invariant to the rotational-angle anomalies in the magnetic alloy.

In operation, the detector measures the strength of the axial component of the magnetic field emanating from the rotatable shaft 12 by monitoring current changes in the coil pairs 14. An example of such a detector is set forth in U.S. Pat. No. 6,330,833, issued Dec. 18, 2001, to Opie et al., the description of which is incorporated herein by reference. The detector includes a triangular wave generator that is coupled to the nodes 20a, 20b for driving a triangular current into the coil pairs 14. The triangular current excites the core elements 18 by driving the core elements 18 in and out of magnetic saturation. For large values of current, the material of the core elements 18 saturates and consequently has a relatively small permeability value. For small values of current, the material of each core element 18 is unsaturated and its permeability increases. The voltage value across the nodes 20a, 20b, which is measured via a voltage sensor, is proportional to the permeability of each of the core elements 18.

When no torque is transmitted to the rotatable shaft 12, no magnetic field emanates from the shaft 12 and a state of equilibrium is maintained. If torque is transmitted to the shaft 12, the permeability of each core element 18 changes as a result of a change in the magnetic field emanating from the shaft 12. The change in the magnetic field emanating from the shaft 12 causes a periodic peaking of the permeability of each coil element 18 to shift with respect to a point in time. The detector also includes an analyzer that translates the time shift of the periodic peaking of the permeability into a corresponding value of torque. An indicator coupled to the analyzer produces an output signal representing the magnitude of torque applied to the shaft 12.

It should be appreciated by one of ordinary skill in the art that the first and second coils 14a, 14b of each coil pair 14 are wound in opposite directions relative to one another to establish a divergent relationship with regard to an external magnetic field. Consequently, the net external magnetic field detected by the detector is zero. By positioning coil pairs 14 circumferentially around the rotatable shaft 12, effects of inhomogeneities in the magnetic field emanating from the shaft 12 resulting from anomalies in the magnetic alloy of the shaft 12 can be reduced. By positioning the coil pairs 14 closely together, effects of the inhomogeneities in the magnetic field emanating from the shaft 12 can be substantially eliminated.

Another torque sensor 30 according to the invention is illustrated in FIG. 4. This torque sensor 30 is similar to the torque sensor 10 described above except this torque sensor 30 has a bobbin 32 formed from a plurality of support elements covering a circumferential angular expanse of a rotatable shaft 34, which can be joined about a reduced diameter portion 34a of the shaft 34. For example, the bobbin 32 can be formed from two (as illustrated), or possible more, diametrically disposed, semi-cylindrical elements 32a, 32b. Each semi-cylindrical element 32a, 32b supports a plurality of sensing elements in the form of coil pairs 14. Each coil pair 14 includes a first coil 14a and a second coil 14b. The first and second coils 14a, 14b and the coil pairs 14 formed thereby are connected in series, as are the coil pairs 14 of the two diametrically disposed, semi-cylindrical elements 32a, 32b. Alternatively, the coil pairs 14 of the two diametrically disposed, semicylindrical elements 32a, 32b and further, each of the coil pairs 14 and each of the first and second coils 14a, 14b formed thereby, can be individually connected to the detector which thereafter arithmetically combines the response of the individual coils 14a, 14b to produce an aggregate output signal which is invariant to the rotational-angle anomalies in the magnetic alloy. This torque sensor 30 is well suited for use in measuring torque transmitted to a rotatable shaft having enlarged diameter portions, such as the spline ends 34b illustrated in the drawings.

Figure 6:
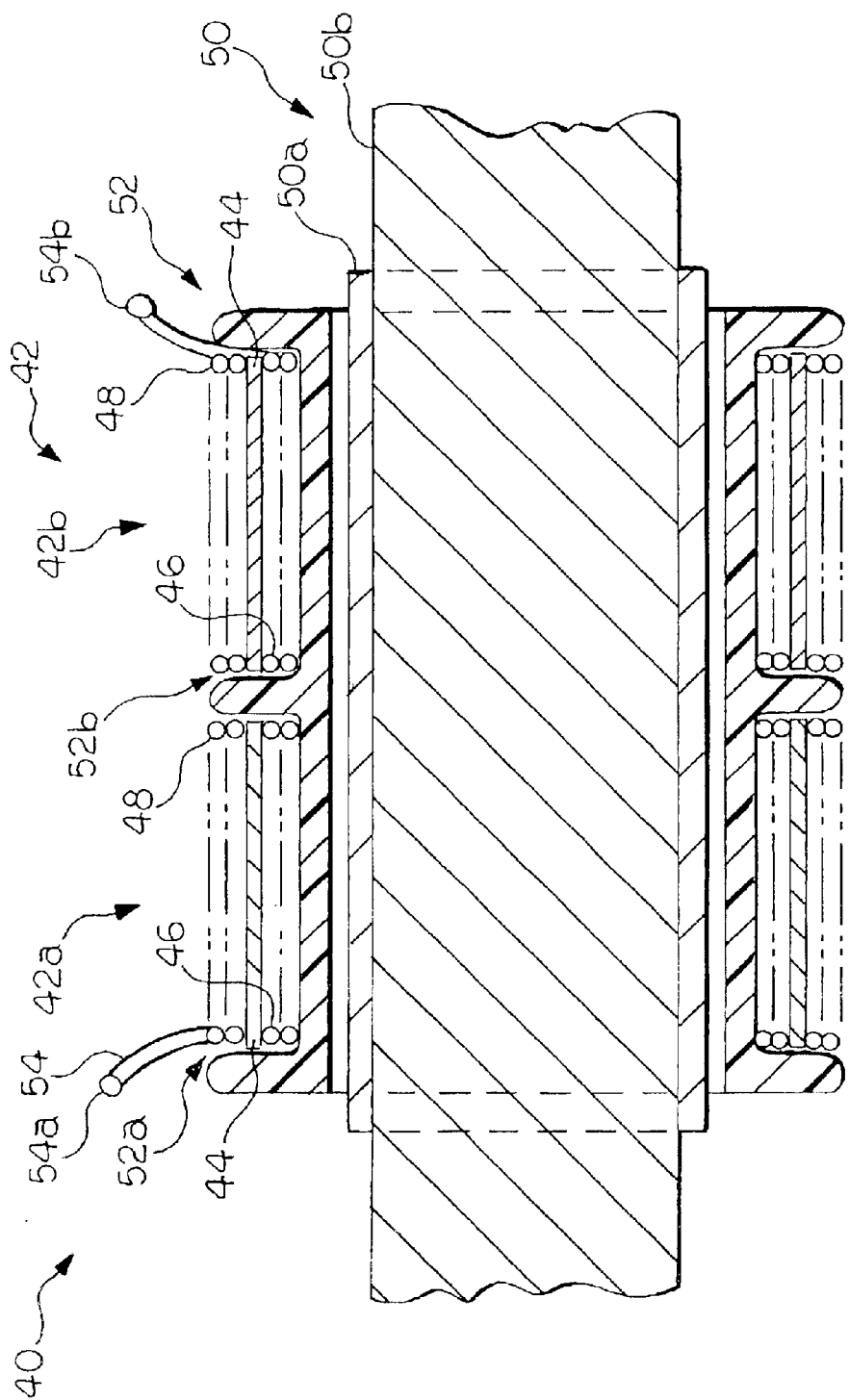
FIG. 6 is a sectional view of the torque sensor illustrated in FIG. 5.
Figure 7:
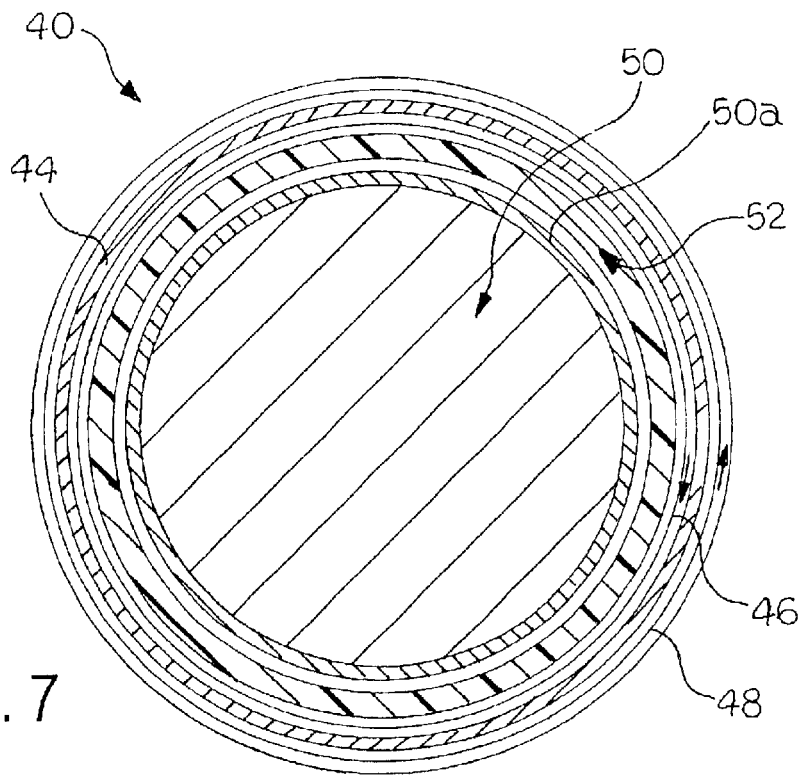
FIG. 7 is a diagrammatic representation in cross-section of the torque sensor illustrated in FIG. 6.

Another torque sensor 40 according to the invention is illustrated in FIGS. 5–7. This torque sensor 40 has a magnetic field sensing element in the form of a coil pair 42 comprised of a first coil 42a and a second coil 42b which is wound in a direction opposite to that of the first coil 42a. Each coil 42a, 42b has a foil core element 44, which is supported between an inner coil winding 46 and an outer coil winding 48, as is clearly illustrated in FIGS. 6 and 7. The foil core element 44, which is the active sensing component of the magnetic field sensing element, completely encircles a rotatable shaft 50, thereby providing the circumferential angular coverage desired of the sensing element. The inner coil winding 46 of each coil 42a, 42b is wound in a direction opposite to that of its outer coil winding 48.

The coil pair 42 is held in spaced relation to a magnetic alloy layer 50a carried on an outer peripheral surface 50b of the rotatable shaft 50. This can be accomplished with any suitable support material, such as the bobbin 52 illustrated in the drawings. This bobbin 52 has a first groove 52a and a second groove 52b formed therein. The first groove 52a and the second groove 52b are axially disposed in end-to-end alignment with one another. The first groove 52a is provided for supporting the first coil 42a and the second groove 52b is provided for supporting the second coil 42b.

According to a preferred embodiment of the invention, the inner and outer coil windings 46, 48 and the first and second coils 42a, 42b formed therefrom are connected in series so that the coil pair 42 can be connected to a detector via two nodes 54a, 54b of a single strand of wire 54. Alternatively, the first and second coils 42a, 42b as well as the inner and outer coil windings 46, 48 formed thereby, can be individually connected to the detector which thereafter arithmetically combines the response of the individual coils 42a, 42b to produce an aggregate output signal which is invariant to the rotational-angle anomalies in the magnetic alloy.

This torque sensor 40 operates in a manner similar to the torque sensor 10 and 30 described above. The detector measures the strength of the axial component of the magnetic field emanating from the magnetic alloy layer 50a by monitoring current changes in the coil pair 42. A voltage value across the nodes 54a, 54b, which is measured via a voltage sensor, is proportional to the permeability of the two foil core elements 44. When no torque is transmitted to the shaft 50, no magnetic field emanates from the magnetic alloy layer 50a and a state of equilibrium is maintained. If torque is transmitted to the shaft 50, the permeability of the foil core elements 44 changes as a result of a change in the magnetic field emanating from the magnetic alloy layer 50a. The change in the magnetic field emanating from the magnetic alloy layer 50a causes a periodic peaking of the permeability of the foil coil elements 44 to shift with respect to a point in time. An analyzer translates the time shift of the periodic peaking of the permeability into a corresponding value of torque. An indicator coupled to the analyzer produces an output signal representing the magnitude of torque applied to the shaft 50.

It should be appreciated by one of ordinary skill in the art that the first and second coils 42a, 42b of the coil pair 42 are wound in opposite directions relative to one another to establish a divergent relationship with regard to an external magnetic field. Consequently, the net external magnetic field detected by the detector is zero. By positioning each of the first and second coils 42a, 42b circumferentially around the magnetic alloy layer 50a, effects of inhomogeneities in the magnetic field emanating from the magnetic alloy layer 50a resulting from anomalies in the magnetic alloy are substantially eliminated.

Figure 8:
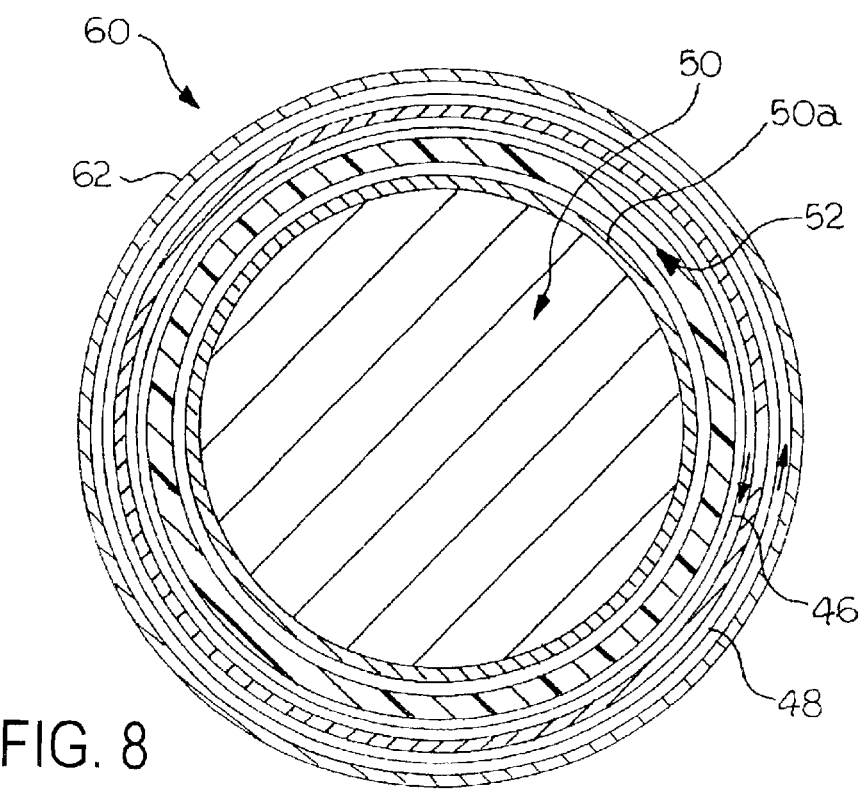
FIG. 8 is a diagrammatic representation in cross-section of the torque sensor illustrated in FIG. 7 with an element thereabout that functions as a return path for a magnetic field.

Another torque sensor 60 according to the invention is illustrated in FIG. 8. This torque sensor 60 is similar to the torque sensor 40 described immediately above but further includes a magnetic flux return element 62 about each outer coil winding 48. The flux return element 62 functions as a return path for a magnetic field emanating from the foil core elements 44 and thus reduces the current required to drive the coil pair 42.

Figure 9:
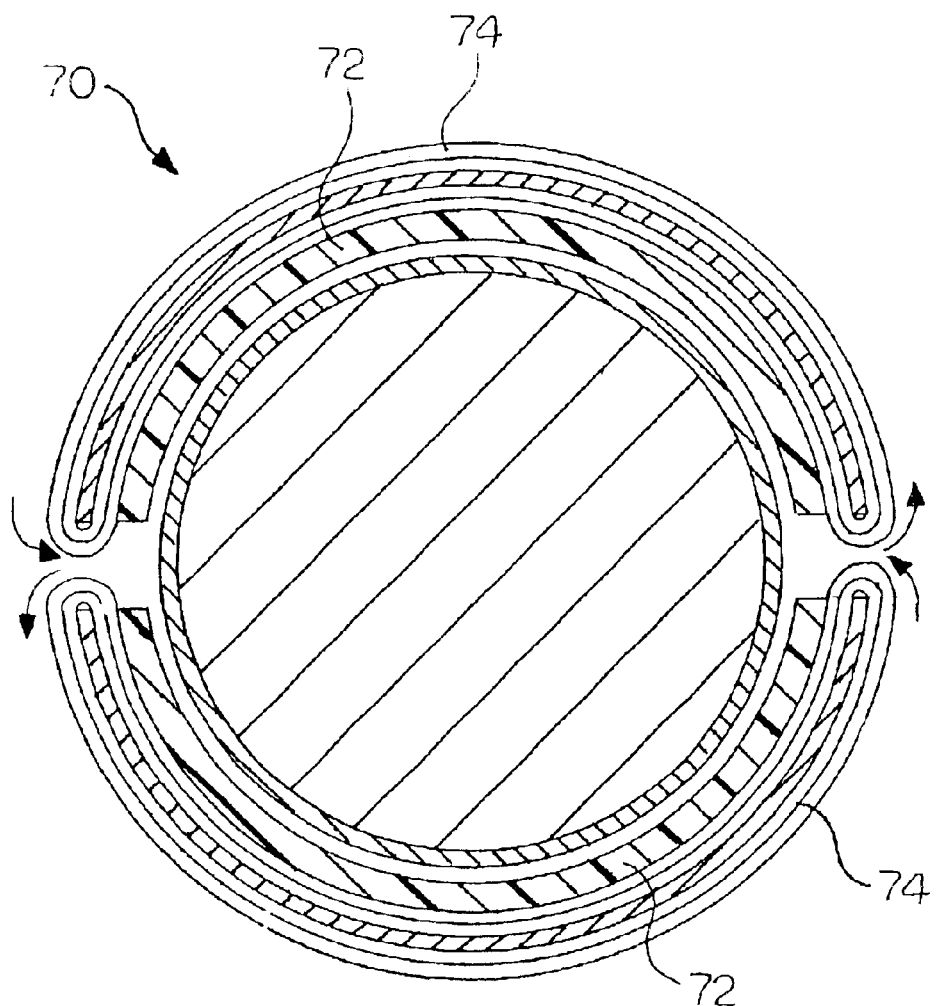
FIG. 9 is a diagrammatic representation in cross-section of another torque sensor according to the invention.

Another torque sensor 70 according to the invention is illustrated in FIG. 9. This torque sensor 70 is similar to the torque sensor 40 described above except each coil is formed from a plurality of elements. For example, each coil can be formed from two (as illustrated), or possible more, diametrically disposed, semi-cylindrical foil core elements 72 and a coil winding 74 wound about the foil core element 72. Each adjacent coil winding 74 is wound so that the flow of current used to excite the foil core elements 72 is in the same circumferential direction for the outer layers of the two coil windings 74, and similarly so for the inner layers, as diagrammatically illustrated in the drawing. The direction of current flow is in opposing directions between the outer and inner layers. According to a preferred embodiment of the invention, the coil windings 74 are connected in series so that the coil pair can be connected to a detector via two nodes of a single strand of wire (not shown). Alternatively, the coil windings 74 can be individually connected to the detector which thereafter arithmetically combines the response of the coils 74 to produce an aggregate output signal which is invariant to the rotational-angle anomalies in the magnetic alloy.

Figure 10:
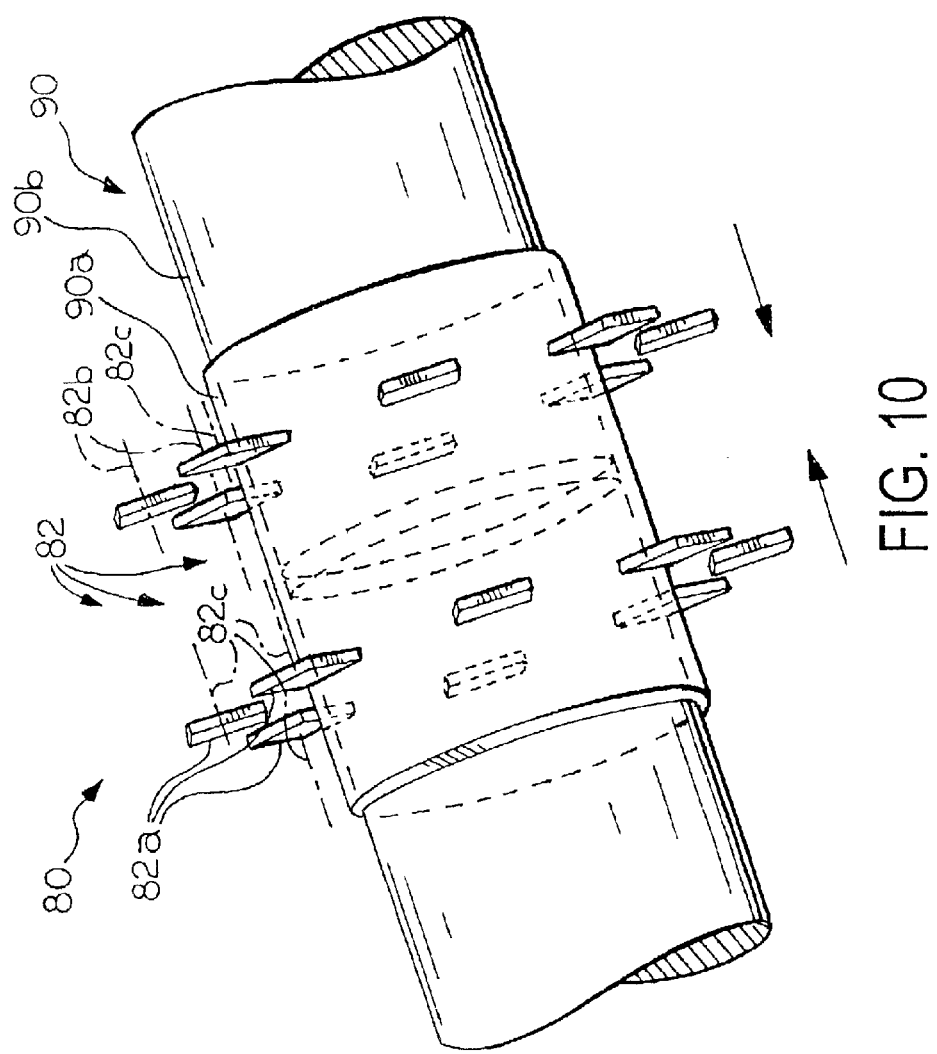
FIG. 10 is a diagrammatic representation in perspective of still another torque sensor according to the invention.

Another torque sensor 80 according to the invention is illustrated in FIG. 10. This torque sensor 80 has a plurality of sensing elements in the form of Hall plate pairs 82 spaced circumferentially about a magnetic alloy layer 90a carried on an outer circumferential surface 90b of a rotatable shaft 90. Each Hall plate pair 82 includes a first Hall plate 82a and a second Hall plate 82b axially spaced relative to one another. Each of the first and second Hall plates 82a, 82b has a unique sensing axis 82c, which is perpendicular to a planar surface thereof. Hence, to detect a magnetic field emanating from the magnetic alloy layer 90a in an axial direction relative to the rotatable shaft 90, each of the first Hall plates 82a are placed circumferentially in a first common plane about the magnetic alloy layer 90a and each of the second Hall plates 82b are placed circumferentially in a second common plane about the magnetic alloy layer 90a.

In operation, current flows through each of the first Hall plates 82a in a first direction and each of the second Hall plates 82b in a second direction opposite to that flowing through each of the first Hall plates 82a. The current flowing through the first and second Hall plates 82a, 82b is further flowing at a right angle relative to the sensing axis of the first and second Hall plates 82a, 82b. This produces a voltage drop across each of the first and second Hall plates 82a, 82b at a right angle to both the current and the magnetic field flowing therethrough. The voltage drop across the plates 82a, 82b corresponds to a value of torque. The first Hall plates 82a are oriented in a first direction and the second Hall plates 82b are oriented in a direction opposite to that of the first Hall plate 82a so that the net external magnetic field detected by the Hall plates 82a, 82b is zero.

According to a preferred embodiment of the invention, the first and second Hall plates 82a, 82b and the Hall plate pairs 82 formed thereby are connected to a detector in series. Alternatively, the Hall plates 82a, 82b and/or the Hall plate pairs 82 can be individually connected to the detector. It should be appreciated by one of ordinary skill in the art that, by positioning the first and second Hall plates 82a, 82b closely circumferentially around the magnetic alloy layer 90a, effects of inhomogeneities in the magnetic field emanating from the magnetic alloy layer 90a resulting from anomalies in the magnetic alloy are substantially eliminated.

Figure 11:
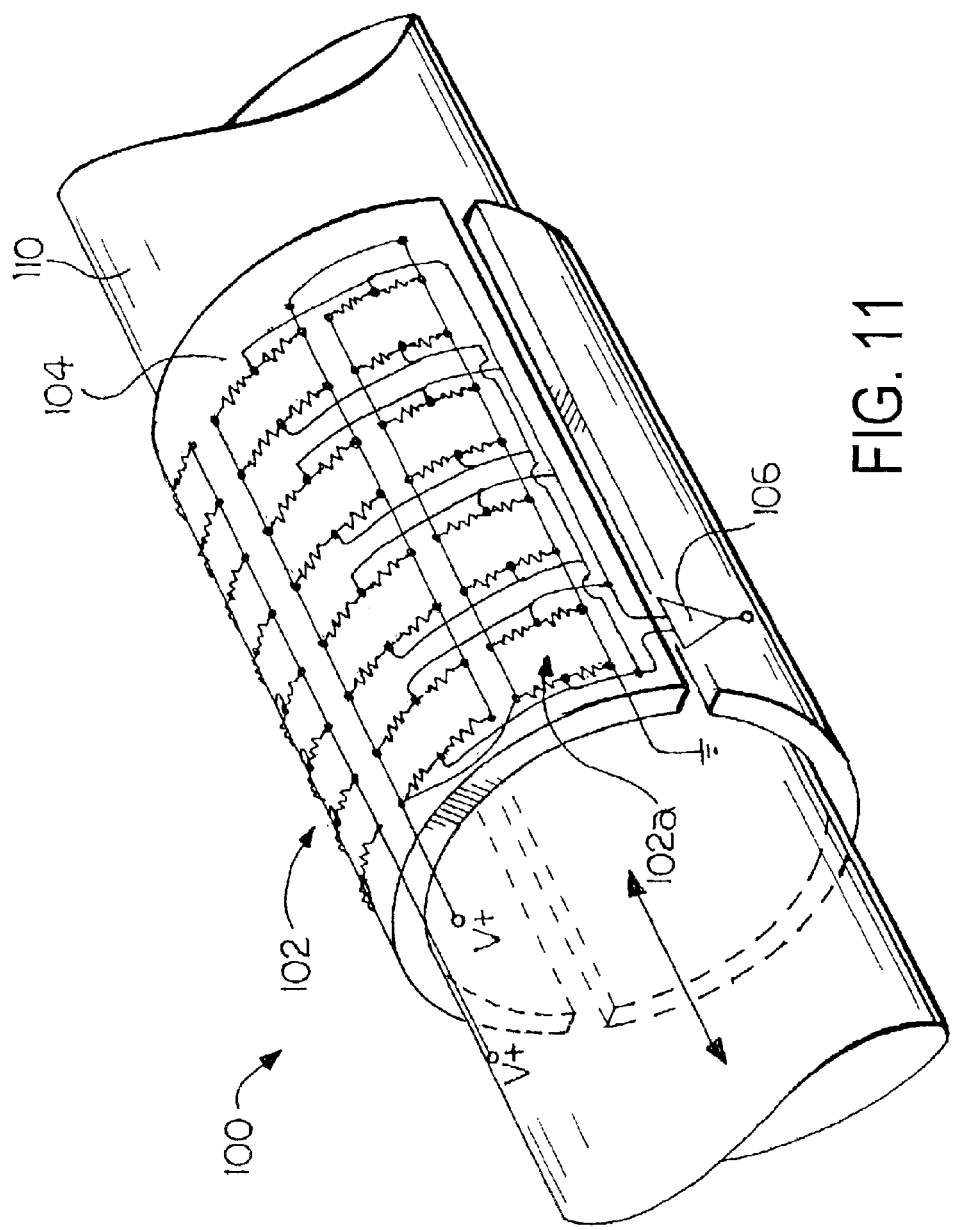
FIG. 11 is a diagrammatic representation in cross-section of still another torque sensor according to the invention.

Another torque sensor 100 according to the invention is illustrated in FIG. 11. This torque sensor 100 has a sensing element in the form of an array of anisotropic magneto resistors (AMRS) 102. The array of AMRs 102 can be deposited on any substrate material 104 that can be shaped to conform to the shape of the rotatable shaft 110. The substrate material 104 can include but not be limited to Permalloy. The array of AMRs 102 illustrated in the drawings uses a plurality of AMR element patches 102a, each having four magneto resisters in a Wheatstone bridge configuration. The patches 102a can be driven by one source of current. There can be voltage taps on each AMR element patch 102a or a single parallel voltage tap for the entire AMR array 102. A differential amplifier 106 and signal conditioning circuitry (not shown) can measure the voltage tap.

Figure 12:
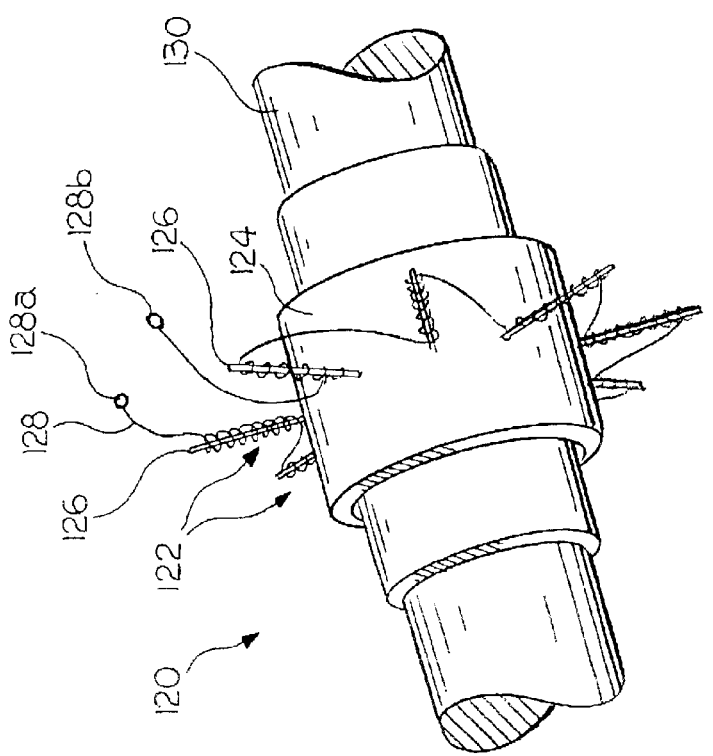
FIG. 12 is a perspective view of a torque sensor according to the invention for detecting magnetic field emanating from a rotatable shaft in a radial direction relative to the shaft.
Figure 13:
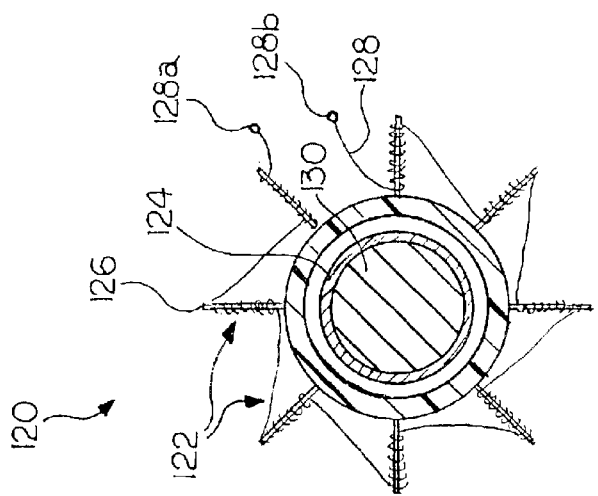
FIG. 13 is a sectional view of the torque sensor illustrated in FIG. 12.
Figure 14:
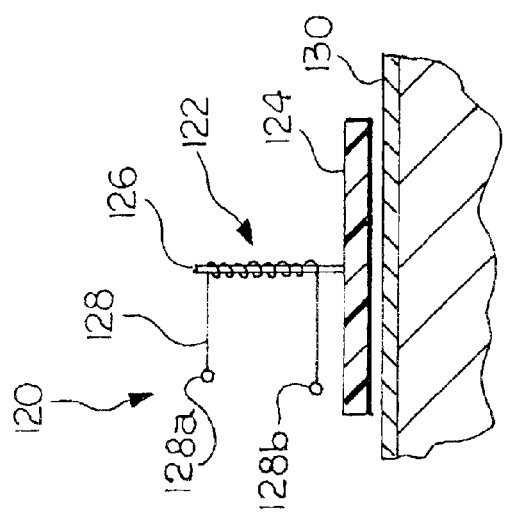
FIG. 14 is an enlarged partial diagrammatic representation in cross-section of the torque sensor illustrated in FIG. 13.

Each of the foregoing torque sensors detect a magnetic field emanating from a rotatable shaft in an axial direction relative to the shaft. The present invention is not limited to torque sensors for detecting magnetic fields emanating from rotatable shafts in an axial direction relative to the shafts. For example, in FIGS. 12–14 there is illustrated a torque sensor 120 for detecting a magnetic field emanating from a rotatable shaft 130 at a boundary between two torque sensing zones and in a radial direction relative to the shaft 130. This torque sensor 120 is comprised of a plurality of coils 122 held in spaced relation to the shaft 130. This can be accomplished with any suitable support, such as the bobbin 124 shown. Each coil 122 is comprised of a winding supported by a core element 126 that is made of a magnetic alloy. The coils 122 extend radially relative to the shaft 130 and circumferentially in a common plane. All the coils 122 can be wound from a single strand of wire 128, as illustrated in the drawings, and connected to a detector (not shown) by the single strand of wire 128. Alternatively, the coils 122 can be individually connected to the detector which thereafter arithmetically combines the response of the individual coils 122 to produce an aggregate output signal which is invariant to the rotational-angle anomalies in the magnetic alloy.

The operation of this torque sensor 120 is similar to the operation of the torque sensors set forth above. For example, the detector measures the strength of the radial component of the magnetic field emanating from the rotatable shaft 130 by monitoring current changes in the coils 122. A voltage value across the nodes 128a, 128b, which is measured via a voltage sensor, is proportional to the permeability of the core elements 126. When no torque is transmitted to the shaft 130, no magnetic field emanates from the shaft 130 and a state of equilibrium is maintained. If torque is transmitted to the shaft 130, the permeability of the core elements 126 changes as a result of a change in the magnetic field emanating from the shaft 130. The change in the magnetic field emanating from the shaft 130 causes a periodic peaking of the permeability of the coil elements 126 to shift with respect to a point in time. An analyzer translates the time shift of the periodic peaking of the permeability into a corresponding value of torque. An indicator coupled to the analyzer produces an output signal representing the magnitude of torque applied to the shaft 130.

Figure 15:
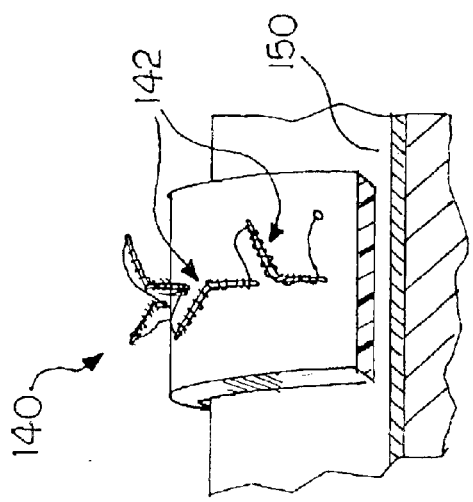
FIG. 15 is a partial diagrammatic representation in cross-section of another torque sensor according to the invention for detecting magnetic field emanating from a rotatable shaft along curved contours in directions at acute angles relative to the shaft.

Another torque sensor 140 is illustrated in FIG. 15. This torque sensor 140 is similar to the immediately preceding torque sensor 120 except the coils 142 are oriented to detect magnetic fields emanating from a rotatable shaft 150 along the contours of the magnetic fields which generally follow curved paths in directions at acute angles relative to the shaft 150.

Figure 16:
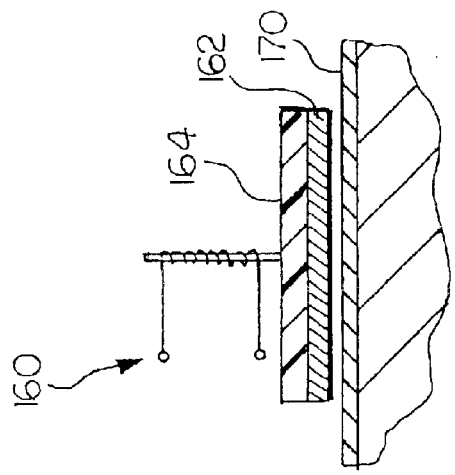
FIG. 16 is a partial diagrammatic representation in cross-section of a torque sensor according to the invention wherein the torque sensor has an element for distributing inhomogeneities in the magnetic field about a rotatable shaft so as to attenuate the inhomogeneities in the vicinity of magnetic field sense elements.

Yet another torque sensor 160 is illustrated in FIG. 16. This torque sensor 160 is similar to the preceding torque sensors 120 and 140 except this torque sensor 160 further includes a flux distribution element 162 between the rotatable shaft 170 and the bobbin 164. Inhomogeneities in a magnetic field emanating from the shaft 170 resulting from anomalies in the magnetic alloy of the shaft 170 are distributed circumferentially into the flux distribution element 162 and thus have attenuated magnitudes relative to the axisymmetric components of the magnetic fields as sensed by the coils.

Figure 18:
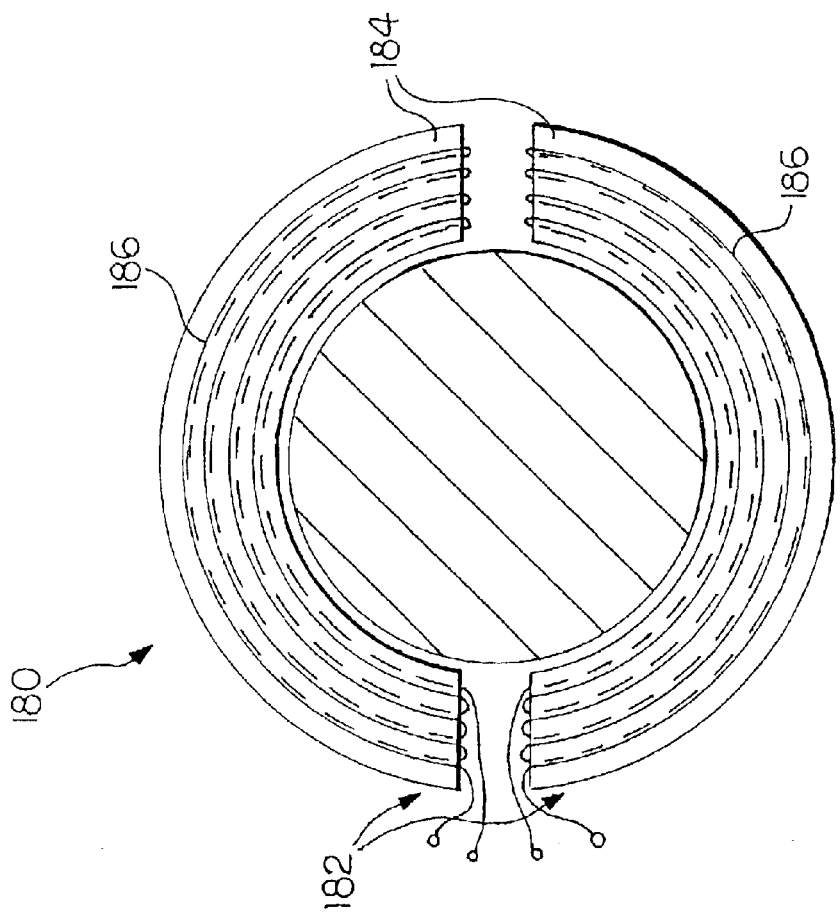
FIG. 18 is an end view in elevation of the torque sensor taken along the line 18—18 in FIG. 17.
Figure 17:
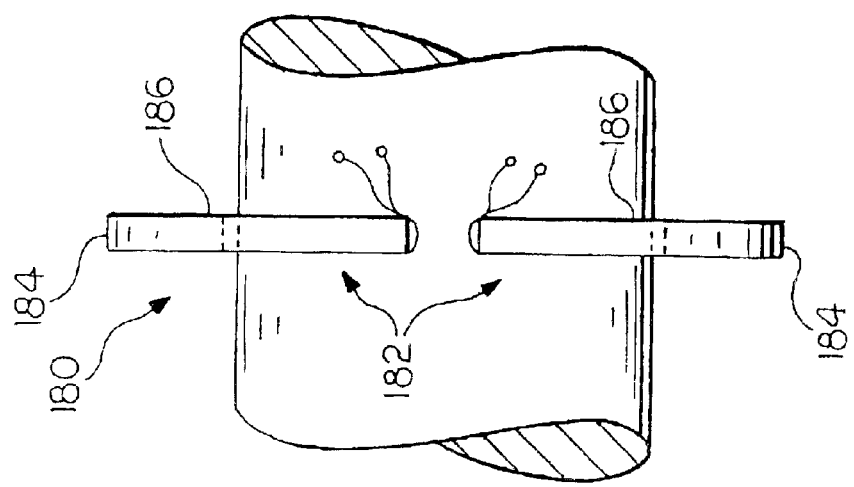
FIG. 17 is a side elevational view of another torque sensor according to the invention.

Another torque sensor 180 is illustrated in FIGS. 17 and 18. This torque sensor 180 is formed from a plurality of sensing elements. Each sensing element includes a coil 182 formed from one, two (as illustrated), or possible more, diametrically disposed, annular or semi-annular foil core elements 184 and a coil winding 186 wound about the foil core elements 184. Yet another torque sensor 200 is illustrated in FIG. 19, wherein the sensing elements are in the form of a circumferential array of Hall plates 202 in spaced relation to a rotatable shaft 210. The sensing axis of each Hall plate 202 is radially directed and positioned at a boundary 210a between two torque sensing zones 210b of the rotatable shaft 210. Each of these torque sensors 180, 200 is provided for detecting a magnetic field emanating from a rotatable shaft 210 in a radial direction relative to the shaft 180, 200.

Torque sensors according to the present invention each comprises a magnetic alloy and one or more sensing elements about the magnetic alloy to detect a magnetic field emanating from the magnetic alloy. Since the sensing elements are distributed circumferentially "about" the magnetic alloy, as opposed to being positioned at an isolated point adjacent to the magnetic alloy, the torque sensor is unaffected by anomalies in magnetic alloy and thus provides an accurate and dependable detection of torque transmitted to the rotatable shaft.

Anomalies in the magnetic field emanating from the magnetic alloy are substantially mitigated by the deployment of magnetic field sensing elements over a circumferential angular expanse of the rotatable shaft in the axial vicinity of magnetoelastically-active torque sensing zones of the shaft. By deploying a circumferentially-distributed field sensing array and producing an accumulated output response from the array, only the axisymmetric component of the magnetic fields emanating from the magnetic alloy is sensed. It is the axisymmetric component that represents the response to the torque applied to the shaft. The anomalous components, which vary with the rotational angle of the shaft, are substantially removed from the output signal.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A torque sensor for magnetically detecting torque transmitted to a rotatable shaft without directly contacting the shaft, said torque sensor comprising:

a magnetic alloy that is adapted to be supported relative to the shaft; and one or more sensing elements about the magnetic alloy to measure a magnetic field emanating from the magnetic alloy without being affected by anomalies in magnetic alloy.

2. A torque sensor according to claim 1 wherein the magnetic alloy is a material component of the shaft.

3. A torque sensor according to claim 1 wherein the magnetic alloy is carried by the shaft.

4. A torque sensor according to claim 1 wherein the one or more sensing elements includes a plurality of coil pairs held in spaced relation to the shaft, each of the coil pairs being wound about a magnetic core element that is separate from the magnetic alloy, each of the coil pairs including a first coil wound in a first direction and a second coil wound in a second direction opposite to the first direction, the first coil and the second coil being axially disposed in end-to-end alignment with one another.

5. A torque sensor according to claim 4 wherein the coil pairs are wound from a single strand of wire having two terminal ends with nodes through which current can be passed.

6. A torque sensor according to claim 4 wherein the coil pairs are supported by a plurality of support elements.

7. A torque sensor according to claim 1 wherein the one or more sensing elements includes a plurality of coils held in spaced relation to magnetic alloy, each one of the coils being comprised of a winding supported by a magnetic core element, the coils being oriented to detect magnetic fields emanating from the magnetic alloy in directions at acute angles relative to the shaft.

8. A torque sensor according to claim 1 further including a flux redistribution element between the magnetic alloy and the one or more sensing elements.

9. A torque sensor according to claim 1 wherein the one or more sensing elements includes a plurality of coils, each one of the coils being formed from one or more diametrically disposed, annular or semi-annular foil core elements and a coil winding wound about the foil core elements.

10. A torque sensor for magnetically detecting torque transmitted to a rotatable shaft without directly contacting the shaft, said torque sensor comprising:
a magnetic alloy; and
one or more sensing elements about the magnetic alloy to measure a magnetic field emanating from the magnetic alloy without being affected by anomalies in magnetic alloy, wherein the one or more sensing elements includes a plurality of coil pairs held in spaced relation to the shaft, each of the coil pairs being wound about a magnetic core element, each of the coil pairs including a first coil wound in a first direction and a second coil wound in a second direction opposite to the first direction, the first coil and the second coil being axially disposed in end-to-end alignment with one another, and wherein the coil pairs are supported by a bobbin formed from two diametrically disposed, semi-cylindrical elements.

11. A torque sensor for magnetically detecting torque transmitted to a rotatable shaft without directly contacting the shaft, said torque sensor comprising:
a magnetic alloy; and
one or more sensing elements about the magnetic alloy to measure a magnetic field emanating from the magnetic alloy without being affected by anomalies in magnetic alloy, wherein the one or more sensing elements are in the form of a coil pair comprised of a first coil and a second coil which is wound in a direction opposite to that of the first coil, the first and second coils each having an inner coil winding and an outer coil winding with a foil core element supported therebetween, the inner coil winding of each of the coils is wound in a direction opposite to that of the outer coil winding thereof.

12. A torque sensor according to claim 11 wherein the coil pair is held in spaced relation to the magnetic alloy by a bobbin having a first groove and a second groove formed therein, the first groove and the second groove are axially disposed in end-to-end alignment with one another, the first groove supporting the first coil and the second groove supporting the second coil.

13. A torque sensor according to claim 11 further including a flux return element about each outer coil winding.

14. A torque sensor according to claim 11 wherein the coil pair is formed from a plurality of elements.

15. A torque sensor according to claim 11 wherein the foil core elements are formed from two diametrically disposed, semi-cylindrical elements and a coil winding wound about the foil core element, each adjacent coil winding being wound in an opposite direction.

16. A torque sensor for magnetically detecting torque transmitted to a rotatable shaft without directly contacting the shaft, said torque sensor comprising:
a magnetic alloy; and
one or more sensing elements about the magnetic alloy to measure a magnetic field emanating from the magnetic alloy without being affected by anomalies in magnetic alloy, wherein the one or more sensing elements are in the form of Hall plate pairs spaced circumferentially about the magnetic alloy, each Hall plate pair including a first Hall plate and a second Hall plate axially spaced relative to one another, each one of the first and second Hall plates having a planar surface and a unique sensing axis, which is perpendicular to the planar surface thereof.

17. A torque sensor according to claim 16 wherein each one of the first Hall plates is placed circumferentially in a first common plane about the magnet alloy and each one of the second Hall plates is placed circumferentially in a second common plane about the magnetic alloy.

18. A torque sensor according to claim 16 wherein the one or more sensing elements are in the form of an array of anisotropic magneto resistors.

19. A torque sensor according to claim 18 wherein the array of anisotropic magneto resistors is deposited on a substrate material that can be shaped to conform to the shape of the magnetic alloy.

20. A torque sensor according to claim 19 wherein the substrate material includes Permalloy.

21. A torque sensor according to claim 18 wherein the array of anisotropic magneto resistors uses a plurality of anisotropic magneto resistor element patches, each having four magneto resisters in a Wheatstone bridge configuration.

22. A torque sensor according to claim 21 wherein the patches are driven by one source of current.

23. A torque sensor for magnetically detecting torque transmitted to a rotatable shaft without directly contacting the shaft, said torque sensor comprising:
a magnetic alloy; and
one or more sensing elements about the magnetic alloy to measure a magnetic field emanating from the magnetic alloy without being affected by anomalies in magnetic alloy, wherein the one or more sensing elements includes a plurality of coils held in spaced relation to magnetic alloy, each one of the coils being comprised of a winding supported by a magnetic core element, the coils extending radially relative to the magnetic alloy and circumferentially in a common plane.

24. A torque sensor according to claim 23 wherein the coils are wound from a single strand of wire.

25. A torque sensor for magnetically detecting torque transmitted to a rotatable shaft without directly contacting the shaft, said torque sensor comprising:

a magnetic alloy; and one or more sensing elements about the magnetic alloy to measure a magnetic field emanating from the magnetic alloy without being affected by anomalies in magnetic alloy, wherein the one or more sensing elements includes a circumferential array of Hall plates in spaced relation to a rotatable magnetic alloy, each of the Hall plates having a sensing axis that is radially directed and positioned at a boundary between two torque sensing zones of the magnetic alloy.

* * * * *